(12) United States Patent
Luo et al.

(10) Patent No.: US 12,260,965 B2
(45) Date of Patent: Mar. 25, 2025

(54) AUTOMATIC LEVELING MAINTENANCE PLATFORM FOR HIGH-TEMPERATURE GAS COOLED REACTOR

(71) Applicant: NUCLEAR POWER INSTITUTE OF CHINA, Chengdu (CN)

(72) Inventors: Ying Luo, Chengdu (CN); Yiwei Jiang, Chengdu (CN); Shuhua Chen, Chengdu (CN); Hua Du, Chengdu (CN); Dailin Dong, Chengdu (CN); Hongxing Yu, Chengdu (CN); Hang Peng, Chengdu (CN); Dapeng Yan, Chengdu (CN)

(73) Assignee: NUCLEAR POWER INSTITUTE OF CHINA, Chengdu (CN)

( * ) Notice: Subject to any disclaimer, the term of this patent is extended or adjusted under 35 U.S.C. 154(b) by 0 days.

(21) Appl. No.: 18/758,284

(22) Filed: Jun. 28, 2024

(65) Prior Publication Data
US 2024/0355494 A1  Oct. 24, 2024

Related U.S. Application Data

(63) Continuation of application No. PCT/CN2023/108011, filed on Jul. 18, 2023.

(51) Int. Cl.
*G21C 19/20* (2006.01)
*G21C 19/02* (2006.01)

(52) U.S. Cl.
CPC .......... *G21C 19/207* (2013.01); *G21C 19/02* (2013.01)

(58) Field of Classification Search
CPC .................................................... G21C 19/207
USPC ......................................................... 376/260
See application file for complete search history.

(56) References Cited

U.S. PATENT DOCUMENTS

| | | | |
|---|---|---|---|
| 5,241,572 A * | 8/1993 | Matthews | G21C 17/00 376/272 |
| 2024/0021330 A1* | 1/2024 | Sudant | G21C 19/207 |

FOREIGN PATENT DOCUMENTS

CN 116168860 A 5/2023

OTHER PUBLICATIONS

International Search Report and Written Opinion issued in International Patent Application No. PCT/CN2023/108011, mailed Nov. 6, 2023; 19 pgs.

(Continued)

*Primary Examiner* — Jack W Keith
*Assistant Examiner* — Daniel Wasil
(74) *Attorney, Agent, or Firm* — HAUPTMAN HAM, LLP

(57) ABSTRACT

An automatic leveling type maintenance platform for a high-temperature gas cooled reactor is provided. A floating plate is automatically leveled by using a leveling liquid. During leveling, only a water driving assembly needs to be controlled to drive a housing to be close to an inner bottom surface of a liquid storage container. A sliding block assembly and a lifting guide mechanism are controlled to be locked and fixed after the floating plate is leveled. The floating plate can allow for automatic and rapid leveling and locking operation. Thus, complex and time-consuming fine adjustment control does not need to be performed. Also, when the platform is used in a spherical top cap of a pressure vessel of the reactor for a maintenance operation, then support legs of a support assembly do not need to have telescopic motion.

16 Claims, 8 Drawing Sheets

(56) References Cited

OTHER PUBLICATIONS

Dong, Dai-lin et al; "Design of the automatic leveling and maintenance platform for reactor"; Journal of Machine Design, vol. 28, No. 5, May 31, 2021; pp. 76-80.

* cited by examiner

AUTOMATIC LEVELING MAINTENANCE PLATFORM FOR HIGH-TEMPERATURE GAS COOLED REACTOR

CROSS REFERENCE TO THE RELATED APPLICATIONS

This application is the continuation application of International Application No. PCT/CN2023/108011, filed on Jul. 18, 2023, which is based upon and claims priority to Chinese Patent Application No. 202310021691.2, filed on Jan. 7, 2023, the entire contents of which are incorporated herein by reference.

TECHNICAL FIELD

The present invention relates to the technical field of reactor maintenance, and specifically, to an automatic leveling type maintenance platform for a high-temperature gas cooled reactor.

BACKGROUND

A high-temperature gas cooled reactor is a fourth-generation reactor. During use, an absorption sphere shutdown system, a control rod shutdown system, and the like on a spherical top cap of a pressure vessel need to be removed for maintenance. The entire maintenance process needs to be performed on the spherical top cap of the pressure vessel, and whether maintenance is successfully performed may directly affect whether subsequent operation of the reactor is normal and whether operating costs are low.

A maintenance platform that is mounted on the spherical top cap of the pressure vessel and that can be automatically leveled is required, to ensure that maintenance can be successfully completed. In an existing automatic leveling type maintenance platform, automatic leveling is achieved by using telescopic support legs and a control system that controls extension or retraction of the support legs respectively. Consequently, the control system needs to perform complex control, and during final fine-tuning, a relatively long time needs to be taken for repeated adjustment. In addition, telescopic movement of the support legs may cause a great stress change on a fulcrum, slipping is prone to occur, the spherical top cap is scrapped due to damage caused on a surface of the spherical top cap, and safety accidents such as platform overturning, and the like may even occur. In view of this, how to quickly and safely level is a problem to be urgently resolved for the existing automatic leveling type maintenance platform.

SUMMARY

The present invention provides an automatic leveling type maintenance platform for a high-temperature gas cooled reactor, which aims to resolve a problem of how to quickly and safely level.

Technical solutions adopted by the present invention to resolve the technical problem thereof are as follows: An automatic leveling type maintenance platform for a high-temperature gas cooled reactor includes a platform body and a support assembly that is configured to support the platform body, and further includes a floating leveling assembly and a water driving assembly.

The platform body includes a liquid storage groove and a housing nested and fitted to a liquid storage cavity of the liquid storage groove. A leveling liquid is accommodated in the liquid storage cavity of the liquid storage groove, and a liquid inlet and outlet structure for the leveling liquid to flow in and flow out is arranged on a bottom plate of the housing.

The floating leveling assembly includes a floating plate arranged in a working cavity of the housing, where at least three telescopic rods that are evenly distributed along a circumferential direction of the floating plate are arranged on a side wall of the floating plate, a sliding block assembly is movably connected to a telescopic end of the telescopic rod, the sliding block assembly is arranged on an inner side wall of the housing through a lifting guide mechanism, and the sliding block assembly is movable along the lifting guide mechanism and is capable of being locked and fixed to the lifting guide mechanism.

The water driving assembly is arranged on the platform body and is capable of driving the housing to be close to or away from an inner bottom surface of the liquid storage groove, to enable the leveling liquid to flow into or flow out of the working cavity of the housing through the liquid inlet and outlet structure, to provide buoyancy for automatic leveling of the floating plate.

Further, the liquid inlet and outlet structure is provided with liquid inlet holes and liquid outlet holes.

There are at least three liquid inlet holes, which are evenly distributed on the bottom plate of the housing around a central axis of the housing.

There are at least three liquid outlet holes, which are evenly distributed on the bottom plate of the housing around the central axis of the housing.

Further, the liquid inlet and outlet structure further includes upper spring switch assemblies for opening and closing the liquid inlet holes and lower spring switch assemblies for opening and closing the liquid outlet holes.

The upper spring switch assemblies and the liquid inlet holes are of a same quantity and are arranged in one-to-one correspondence. The upper spring switch assembly includes a spring support plate arranged in the working cavity of the housing, an upper spring arranged at a bottom of the spring support plate, and an upper sealing head arranged at a lower end of the upper spring. The upper sealing head blocks an upper liquid outlet of the liquid inlet hole.

The lower spring switch assemblies and the liquid outlet holes are of a same quantity and are arranged in one-to-one correspondence. The lower spring switch assembly includes a lower spring arranged on the inner bottom surface of the liquid storage groove, a lower sealing head is arranged at an upper end of the lower spring. The lower sealing head blocks a lower liquid outlet of the liquid outlet hole.

Further, the support assembly includes at least three support legs arranged at a bottom of the liquid storage groove, and the support legs are evenly distributed around a central axis of the platform body.

Further, the floating plate is of a circular structure, and the telescopic rods are radially arranged along the floating plate.

Further, a sliding groove is provided on the inner side wall of the housing.

The sliding block assembly includes a sliding block housing, a sliding block end cap is arranged at one end of the sliding block housing, the sliding block end cap and the sliding block housing jointly enclose a sliding block cavity running through up and down, an upper ball component, a lock plate component, and a lower ball component are sequentially arranged in the sliding block cavity from top to bottom, the lock plate component includes a lock plate bracket, a driving lock plate and a driven lock plate that is in transmission connection with the driving lock plate are arranged in the lock plate bracket, and a locking space is formed between the driven lock plate and the driving lock plate. The sliding block assembly further includes a lock motor arranged on the sliding block housing, and the lock motor and the driving lock plate are in transmission connection to drive the driving lock plate to be relatively close to or away from the driven lock plate.

The lifting guide mechanism includes a sliding rod arranged in the sliding groove, and the sliding rod extends through the locking space and rollably fits a ball of the upper ball component and a ball of the lower ball component respectively.

Further, the lifting guide mechanism further includes a sliding rod support block arranged on an upper end of the sliding groove.

An upper end of the sliding rod is connected to the sliding rod support block, and a lower end of the sliding rod is connected to a lower end groove wall of the sliding groove.

Springs are arranged between an outer wall surface of the driving lock plate and an inner wall surface of the lock plate bracket and are arranged between an outer wall surface of the driven lock plate and the inner wall surface of the lock plate bracket, and the springs are in a compressed state.

Further, the water driving assembly includes at least three motor drive mechanisms that are evenly distributed along a circumferential direction of the housing, the motor drive mechanism includes a motor bracket arranged on an outer side wall of the housing, a drive motor is arranged on the motor bracket, a screw is in transmission connection with a drive end of the drive motor, and the screw is mated with a threaded hole provided on a groove wall of the liquid storage groove.

Further, the automatic leveling type maintenance platform for a high-temperature gas cooled reactor further includes a control assembly.

The control assembly includes a controller in communication connection with the drive motor and a liquid level sensor in communication connection with the controller.

There are at least three liquid level sensors, which are arranged in the working cavity of the housing and are evenly distributed around the central axis of the housing.

Further, a liquid level sensor mounting groove is provided on the inner side wall of the housing, and the liquid level sensor is arranged in the liquid level sensor mounting groove.

The advantageous effects of the present invention are as follows.

(1) In the automatic leveling type maintenance platform for a high-temperature gas cooled reactor, the water driving assembly is arranged on the platform body, and the water driving assembly can drive the housing to be close to or away from the inner bottom surface of the liquid storage groove, to enable the leveling liquid to flow into or flow out of the working cavity of the housing through the liquid inlet and outlet structure. In addition, the floating plate is arranged in the working cavity of the housing, and the sliding block assembly that is movable along the lifting guide mechanism and that can be locked and fixed to the lifting guide mechanism is movably connected to the floating plate through the telescopic rod. In this way, the leveling liquid in the working cavity of the housing can provide buoyancy for the floating plate, so that the floating plate is automatically and quickly adjusted to a horizontal state, and the floating plate on which leveling is performed may be locked and fixed to the lifting guide mechanism through the sliding block assembly. When the maintenance platform is used in a spherical top cap of a pressure vessel of the high-temperature gas cooled reactor for maintenance operation, the support legs of the support assembly do not need to perform telescopic motion, which prevents the support legs from damaging a surface of the spherical top cap due to a great stress change caused by extension or retraction, and avoids safety accidents such as platform overturning, and the like.

(2) During automatic leveling of the automatic leveling type maintenance platform for a high-temperature gas cooled reactor, the floating plate is automatically leveled mainly by using the leveling liquid, only the water driving assembly needs to be controlled to drive a housing to be close to the inner bottom surface of the liquid storage groove to enable the leveling liquid flow into the working cavity of the housing through the liquid inlet and outlet structure, and the sliding block assembly and the lifting guide mechanism are controlled to be locked and fixed after the floating plate is leveled. In this way, complex and time-consuming fine adjustment control does not need to be performed, and the floating plate can implement automatic and rapid leveling and locking operation, so that a leveling effect is better, and control is more convenient.

(3) The leveling liquid further has a shock absorption and buffering effect on the floating plate. During maintenance operation, vibration generated by the platform may not easily affect the support legs, and the leveling liquid may further reduce harm caused by a safety accident such as platform slipping or falling.

Figure 1:
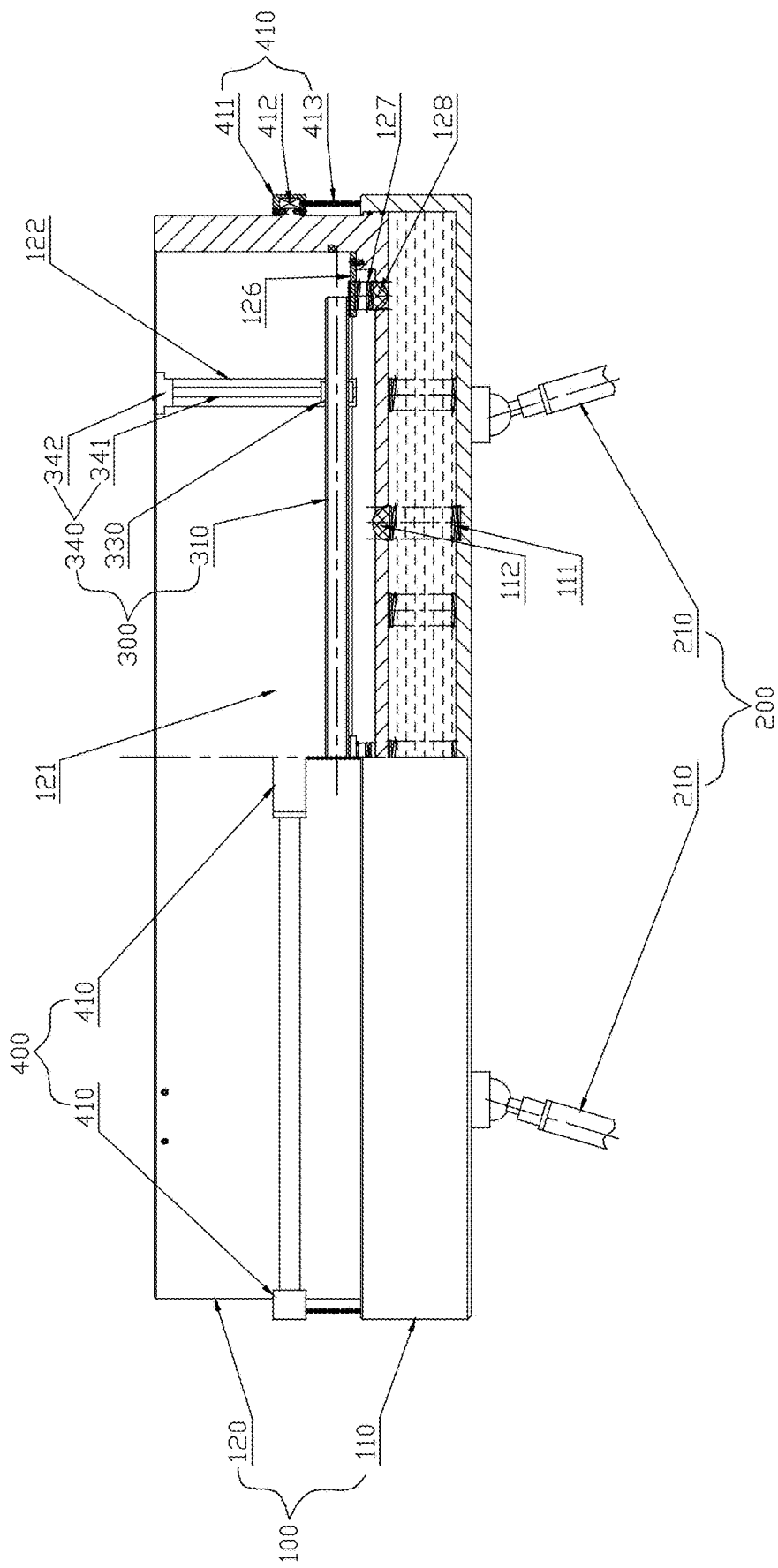
FIG. 1 is a first schematic diagram of a half-section structure according to the present invention.

Reference numerals in the figures are as follows: 100—platform body; 110—liquid storage container, 111—lower spring, 112—lower sealing head; 120—housing; 121—working cavity; 122—sliding groove; 123—liquid inlet hole; 124—liquid outlet hole; 125—liquid level sensor mounting groove; 126—spring support plate; 127—upper spring; 128—upper sealing head; 200—support assembly; 210—support leg; 300—floating leveling assembly; 310—floating plate; 320—telescopic rod; 330—sliding block assembly; 331—sliding block housing; 332—sliding block end cap; 333—upper ball component; 334—lower ball component; 335—lock plate bracket; 336—driving lock plate; 337—driven lock plate; 338—lock motor; 339—spring; 340—lifting guide mechanism; 341—sliding rod; 342— sliding rod support block; 351—synchronization rod; 400—water driving assembly; 410—motor drive mechanism; 411—motor bracket; 412—drive motor; 413—screw; and 510—liquid level sensor.

DETAILED DESCRIPTION OF THE EMBODIMENTS

The following further describes the present invention with reference to the accompanying drawings.

In the description of the present invention, it is to be noted that, orientation or position relationships indicated by terms such as "up", "down", "inside", "outside", "top", and "bottom" are based on orientation or position relationships shown in the accompanying drawings, and are used only for ease of description, rather than indicating or implying that the mentioned apparatus or component needs to have a particular orientation or needs to be constructed and operated in a particular orientation. Therefore, such terms should not be construed as limiting of the present invention. The term "a plurality of" means three or more than three. The expression "mainly includes" is interpreted as that structural components not mentioned herein may further be included. The term "and/or" describes only an association relationship for describing associated objects and represents that three relationships may exist. For example, A and/or B may represent the following three cases: Only A exists, both A and B exist, and only B exists.

Figure 2:
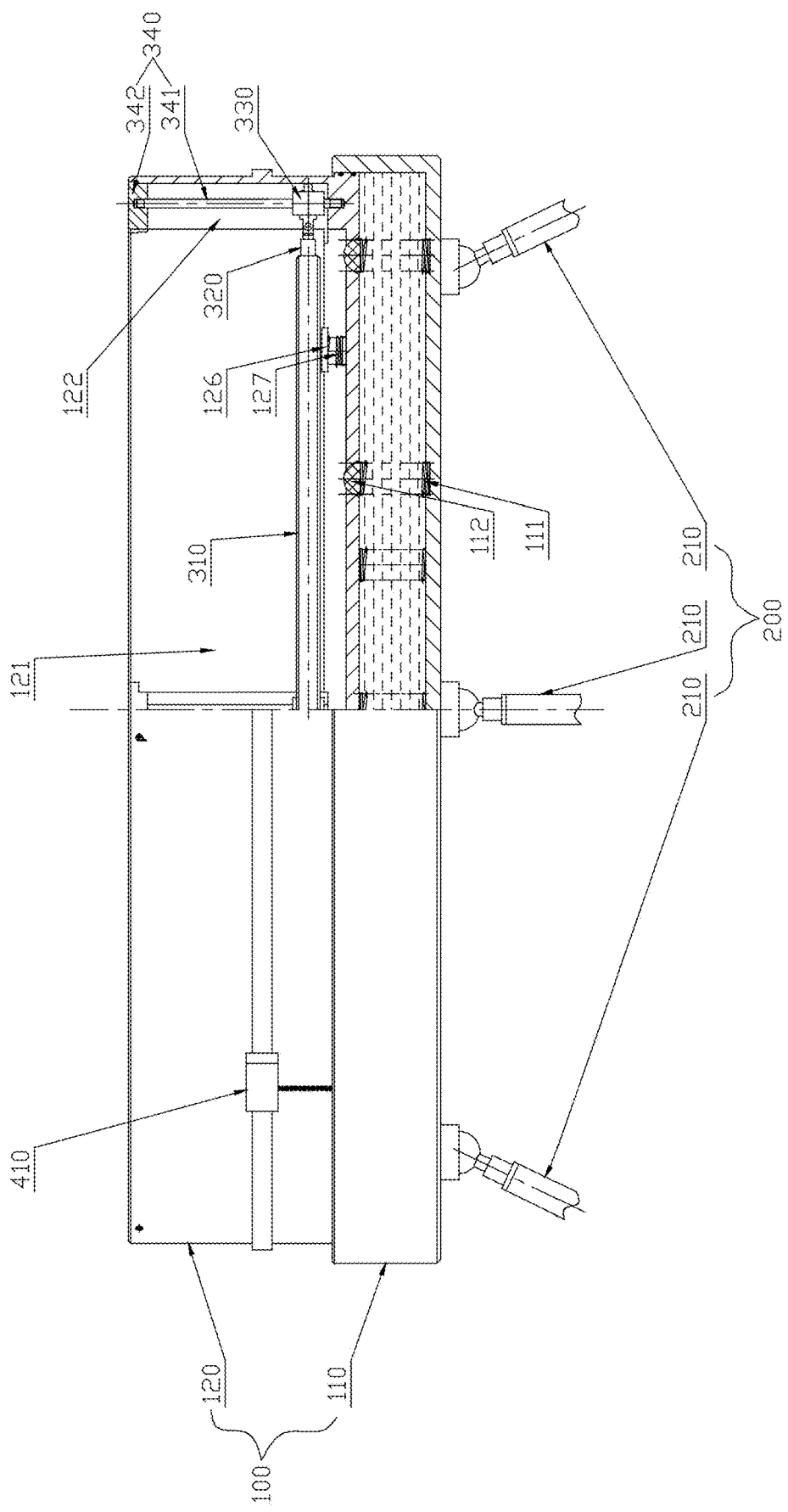
FIG. 2 is a second schematic diagram of a half-section structure according to the present invention.

With reference to FIG. 1 and FIG. 2, an automatic leveling type maintenance platform for a high-temperature gas cooled reactor includes a platform body 100 and a support assembly 200 that is configured to support the platform body 100, and further includes a floating leveling assembly 300 and a water driving assembly 400.

The platform body 100 includes a liquid storage container 110 110 and a housing 120 nested and fitted to a liquid storage cavity of the liquid storage container 110 110. A leveling liquid is accommodated in the liquid storage cavity of the liquid storage container 110 110. The leveling liquid may be of a plurality of types, for example, water, oil, or the like. The housing 120 is mainly configured to temporarily store the leveling liquid and mount and support the floating leveling assembly 300. A sealing structure is usually arranged between the housing and a cavity wall of the liquid storage cavity, for example, an annular groove is provided on an outer side wall of the housing 120, and a sealing ring is arranged in the annular groove. A liquid inlet and outlet structure for the leveling liquid to flow in and flow out is arranged on a bottom plate of the housing 120. The liquid inlet and outlet structure may be of a plurality of types, for example, liquid inlet and outlet holes, liquid inlet and outlet channels, or the like.

The support assembly 200 is an assembly that is mounted and placed to support the entire platform. The support assembly usually includes at least three support legs 210 arranged at a bottom of the liquid storage groove 110, and the support legs 210 are evenly distributed around a central axis of the platform body 100. The support leg 210 may be of a plurality of structures, preferably, a structure including a leg rod body and a movable connector arranged at an upper end of the leg rod body. The leg rod body may be a straight rod, a telescopic rod, a cylinder, an oil cylinder, or the like. The movable connector may be a rotating joint, a spherical rotating head, or the like.

The floating leveling assembly 300 is an assembly that can be automatically leveled and can be locked and fixed. The floating leveling assembly 300 includes a floating plate 310 arranged in a working cavity 121 of the housing 120. The floating plate 310 may be made of a material that can float on the leveling liquid, or is made into a structure that can float on the leveling liquid, for example, a hollow structure, a porous structure, or the like. The floating plate 310 may be in various shapes such as a circle, a rectangle, a polygon, and the like. At least three telescopic rods 320 that are evenly distributed along a circumferential direction of the floating plate 310 are arranged on a side wall of the floating plate 310. The telescopic rod 320 is mainly configured to limit and fix the floating plate 310 in a horizontal direction, and a fixing end of the telescopic rod is generally connected to the side wall of the floating plate 310 vertically through thread connection, screw connection, welding, and the like. The telescopic rod 320 may be of a plurality of types, for example, a cylinder, an oil cylinder, an electric push rod, or the like. A sliding block assembly 330 is movably connected to a telescopic end of the telescopic rod 320, the sliding block assembly 330 is arranged on an inner side wall of the housing 120 through a lifting guide mechanism 340, and the sliding block assembly 330 is movable along the lifting guide mechanism 340 and is capable of being locked and fixed to the lifting guide mechanism 340. The sliding block assembly 330 is mainly configured to fix the floating plate 310 in a vertical direction. The sliding block assembly and the telescopic end of the telescopic rod 320 may be movably connected in a plurality of manners, for example, hinged connection, movable connection through a universal joint, and the like. The lifting guide mechanism 340 is mainly configured to guide the sliding block assembly 330 and parts connected to the sliding block assembly 330 in the vertical direction. The lifting guide mechanism may be of a guide rod structure, a guide groove structure, or the like.

The water driving assembly 400 is arranged on the platform body 100 and is capable of driving the housing 120 to be close to or away from an inner bottom surface of the liquid storage groove 110, to enable the leveling liquid to flow into or flow out of the working cavity 121 of the housing 120 through the liquid inlet and outlet structure, to provide buoyancy for automatic leveling of the floating plate 310. The water driving assembly 400 is an assembly that drives movement of the housing 120. The water driving assembly may be of a plurality of types, for example, a cylinder or an assembly mainly including a plurality of cylinders, an oil cylinder or an assembly mainly including a plurality of oil cylinders, an assembly mainly including a motor and a ball screw pair, and the like.

During automatic leveling of the automatic leveling type maintenance platform for a high-temperature gas cooled reactor, the housing 120 is driven to be close to the inner bottom surface of the liquid storage groove 110 mainly through the water driving assembly 400, to enable the leveling liquid to flow into the working cavity of the housing 120 through the liquid inlet and outlet structure. In addition, the floating plate 310 is arranged in the working cavity of the housing 120, and the sliding block assembly 330 that is movable along the lifting guide mechanism 340 and that can be locked and fixed to the lifting guide mechanism 340 is movably connected to the floating plate 310 through the telescopic rod 320. Therefore, the floating plate 310 can be automatically and quickly leveled by using the leveling liquid, and during this process, only the water driving assembly 400 and the sliding block assembly 330 need to be controlled, and there is no need to perform complex and time-consuming fine adjustment control. When the maintenance platform is used in a spherical top cap of a pressure vessel of the high-temperature gas cooled reactor for maintenance operation, the support legs 210 of the support assembly 200 do not need to perform telescopic motion, which prevents the support legs 210 from damaging a surface of the spherical top cap due to a great stress change caused by extension or retraction, and avoids safety accidents such as platform overturning, and the like.

Figure 4:
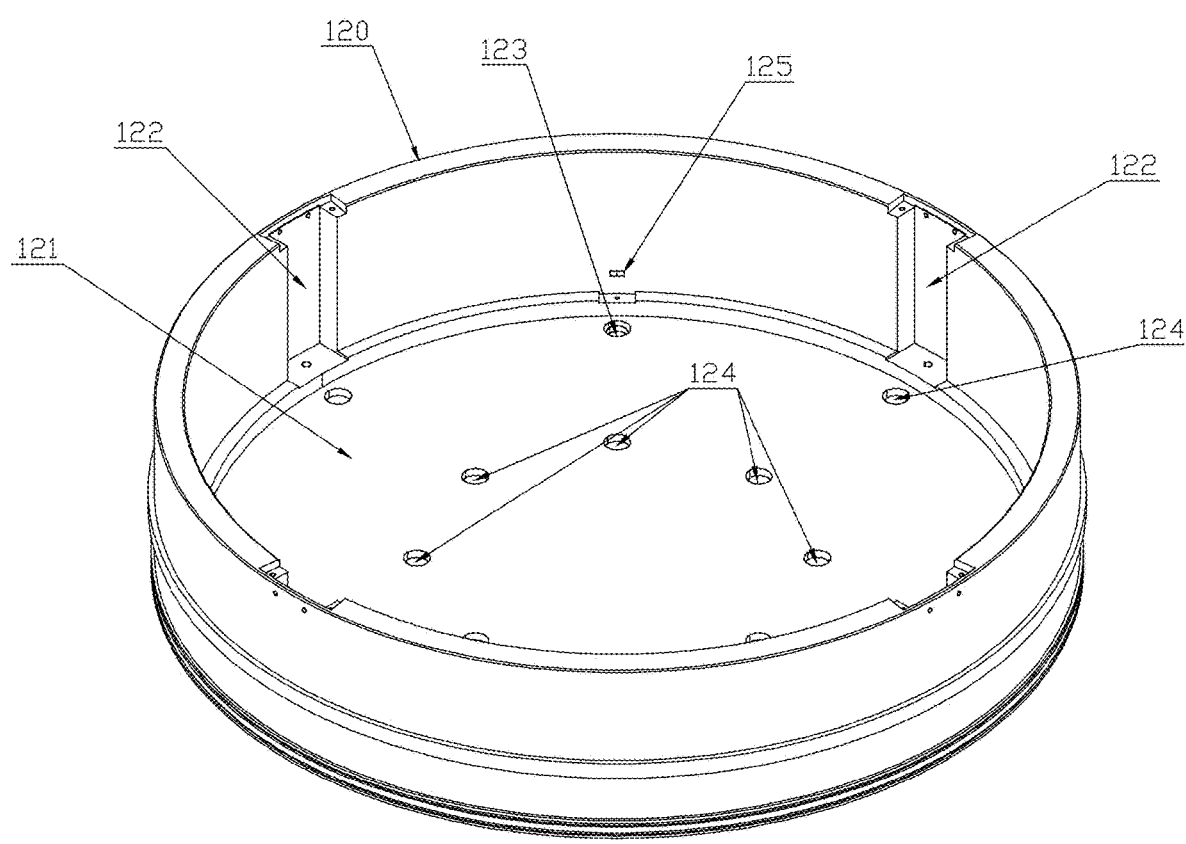
FIG. 4 is a three-dimensional axonometric diagram of a housing according to the present invention.
Figure 5:
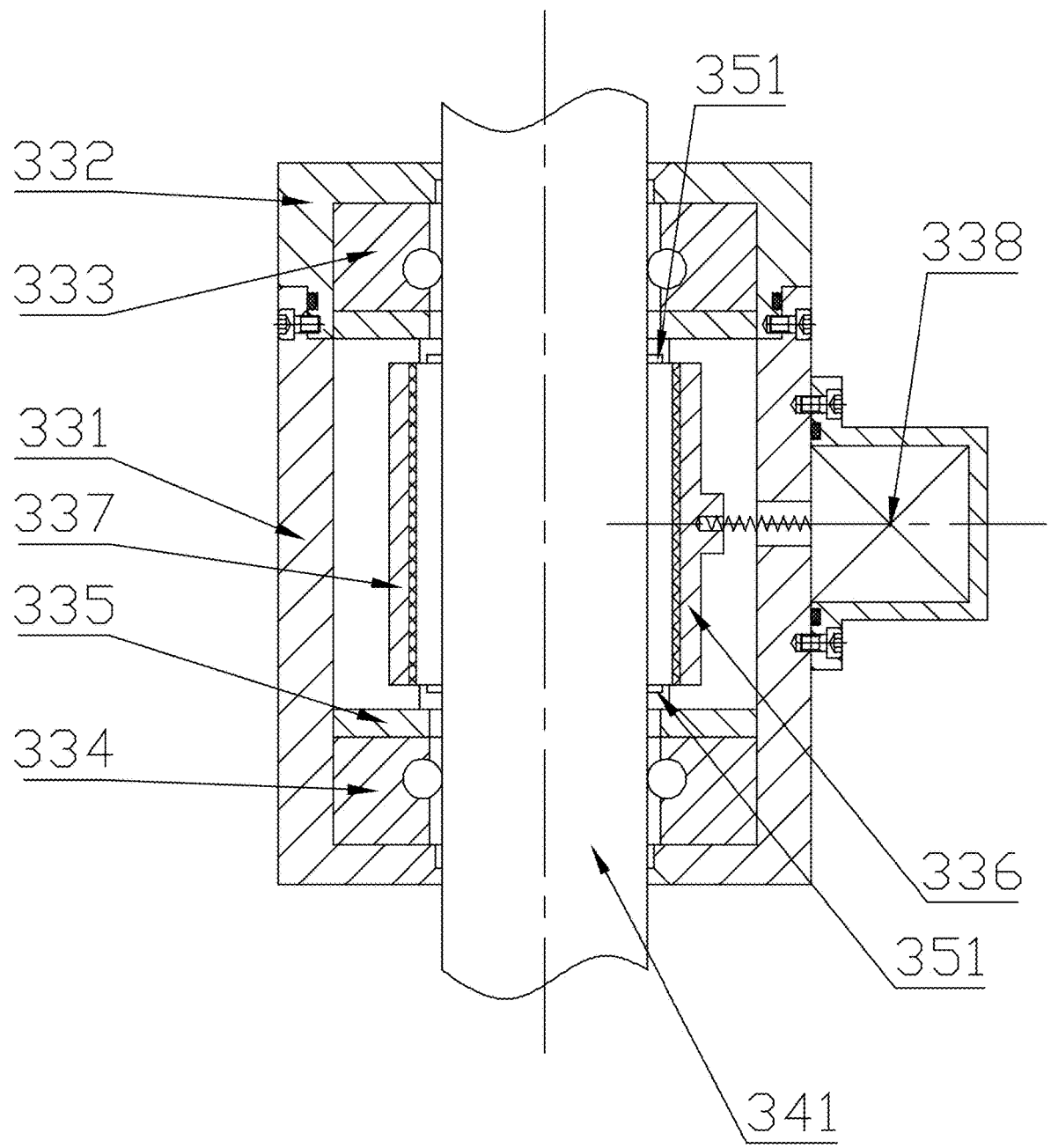
FIG. 5 is a first schematic diagram of a vertical cross-section structure of a sliding block assembly according to the present invention.

To enable the leveling liquid to evenly flow into or flow out of the working cavity 121 of the housing 120, as shown in FIG. 4, the liquid inlet and outlet structure is provided with liquid inlet holes 123 and liquid outlet holes 124.

There are at least three liquid inlet holes 123, which are evenly distributed on the bottom plate of the housing 120 around a central axis of the housing 120. In other words, the plurality of liquid inlet holes 123 are distributed on the bottom plate of the housing 120 in the annular array form with the central axis of the housing 120 as the array central line.

There are at least three liquid outlet holes 124, which are evenly distributed on the bottom plate of the housing 120 around the central axis of the housing 120. In other words, the plurality of liquid outlet holes 124 are distributed on the bottom plate of the housing 120 in the annular array form with the central axis of the housing 120 as the array central line.

To ensure that the leveling liquid can stably and quickly flow in and flow out, preferably, referring to FIG. 4 again, there are four liquid inlet holes 123, and a distance between the liquid inlet holes and the central axis of the housing 120 is greater than a distance between the liquid outlet holes 124 and the central axis of the housing 120.

There are two groups of liquid outlet holes 124. A quantity of a first group of liquid outlet holes 124 is eight, and the first group of liquid outlet holes are distributed near a center of the housing 120 in the annular array form. A quantity of a second group of liquid outlet holes 124 is four, and the second group of liquid outlet holes are distributed near the inner side wall of the housing 120 in the annular array form. A total quantity of liquid outlet holes 124 is twelve.

Preferably, with reference to FIG. 1, FIG. 2, FIG. 3, and FIG. 4, the liquid inlet and outlet structure further includes upper spring switch assemblies for opening and closing the liquid inlet holes 123 and lower spring switch assemblies for opening and closing the liquid outlet holes 124.

The upper spring switch assemblies and the liquid inlet holes 123 are of a same quantity and are arranged in one-to-one correspondence. The upper spring switch assembly includes a spring support plate 126 arranged in the working cavity of the housing 120, an upper spring 127 arranged at a bottom of the spring support plate 126, and an upper sealing head 128 arranged at a lower end of the upper spring 127. The upper sealing head 128 blocks an upper liquid outlet of the liquid inlet hole 123. A non-metal buffer material layer is usually arranged at a top of the spring support plate 126, to prevent the floating plate 310 from rigidly colliding with the spring support plate 126 during falling.

The lower spring switch assemblies and the liquid outlet holes 124 are of a same quantity and are arranged in one-to-one correspondence. The lower spring switch assembly includes a lower spring 111 arranged on the inner bottom surface of the liquid storage groove 110, a lower sealing head 112 is arranged at an upper end of the lower spring 111. The lower sealing head 112 blocks a lower liquid outlet of the liquid outlet hole 124. The upper spring switch assemblies and the lower spring switch assemblies are mainly configured to control a flow rate at which the leveling liquid flows into or flows out of the working cavity of the housing 120, and prevent the leveling liquid from flowing back during a working process.

To improve efficiency of automatic leveling and ensure stability, preferably, the floating plate 310 is of a circular structure, and the telescopic rods 320 are radially arranged along the floating plate 310. The circular floating plate 310 facilitates quick leveling on the liquid and has good stability.

Specifically, four telescopic rods 320 are arranged on the side wall of the floating plate 310. To simplify the structure and ensure flexibility of connection, the telescopic end of the telescopic rod 320 is movably connected to the sliding block assembly 330 by using a universal adaptor. The universal adaptor includes a hinged portion that enables the telescopic rod 320 to rotate relative to the sliding block assembly 330 and a rotating joint that enables the telescopic rod 320 to rotate around a central axis of the telescopic rod.

Preferably, with reference to FIG. 1, FIG. 2, FIG. 3, FIG. 4, FIG. 5, and FIG. 6, a sliding groove 122 is provided on the inner side wall of the housing 120.

The sliding block assembly 330 includes a sliding block housing 331, a sliding block end cap 332 is arranged at one end of the sliding block housing 331, the sliding block end cap 332 and the sliding block housing 331 jointly enclose a sliding block cavity running through up and down, an upper ball component 333, a lock plate component, and a lower ball component 334 are sequentially arranged in the sliding block cavity from top to bottom, the lock plate component includes a lock plate bracket 335, a driving lock plate 336 and a driven lock plate 337 that is in transmission connection with the driving lock plate 336 are arranged in the lock plate bracket 335, and a locking space is formed between the driven lock plate 337 and the driving lock plate 336. The sliding block assembly 330 further includes a lock motor 338 arranged on the sliding block housing 331, and the lock motor 338 and the driving lock plate 336 are in transmission connection to drive the driving lock plate 336 to be relatively close to or away from the driven lock plate 337.

The lifting guide mechanism 340 includes a sliding rod 341 arranged in the sliding groove 122, and the sliding rod 341 extends through the locking space and rollably fits a ball of the upper ball component 333 and a ball of the lower ball component 334 respectively.

The driving lock plate 336 may be in transmission connection with the driven lock plate 337 in a plurality of manners. For example, transmission connection is implemented through a synchronization rod 351. In another example, transmission connection is implemented through a threaded rod, and a rotating direction of a thread for connecting the driving lock plate 336 is opposite to a rotating direction of a threaded for connecting the driven lock plate 337. When the sliding block assembly 330 needs to be locked and fixed to the lifting guide mechanism 340, the lock motor 338 is used to drive the driving lock plate 336 to be relatively close to the driven lock plate 337, to further drive the driving lock plate 336 and/or the driven lock plate 337 to abut against the sliding rod 341, thereby achieving locking and fixing. When the sliding block assembly 330 needs to be loosened from the lifting guide mechanism 340, the lock motor 338 is used to drive the driving lock plate 336 to be relatively away from the driven lock plate 337, to further drive the driving lock plate 336 and the driven lock plate 337 to be away from the sliding rod 341, thereby achieving loosening. This ensures that the sliding block assembly 330 can slides relative to the lifting guide mechanism 340.

Based on this, to strengthen a friction force of contact, friction enhancement layers are usually arranged both on an inner wall surface of the driving lock plate 336 and an inner wall surface of the driven lock plate 337. The friction enhancement layer is usually made of a wear-resistant material with a high friction coefficient, such as rubber.

To facilitate mounting and fixing of the sliding rod 341, referring to FIG. 1, FIG. 2, and FIG. 3 again, the lifting guide mechanism 340 further includes a sliding rod support block 342 arranged at an upper end of the sliding groove 122.

An upper end of the sliding rod 341 is connected to the sliding rod support block 342, and a lower end of the sliding rod 341 is connected to a lower end groove wall of the sliding groove 122.

Figure 6:
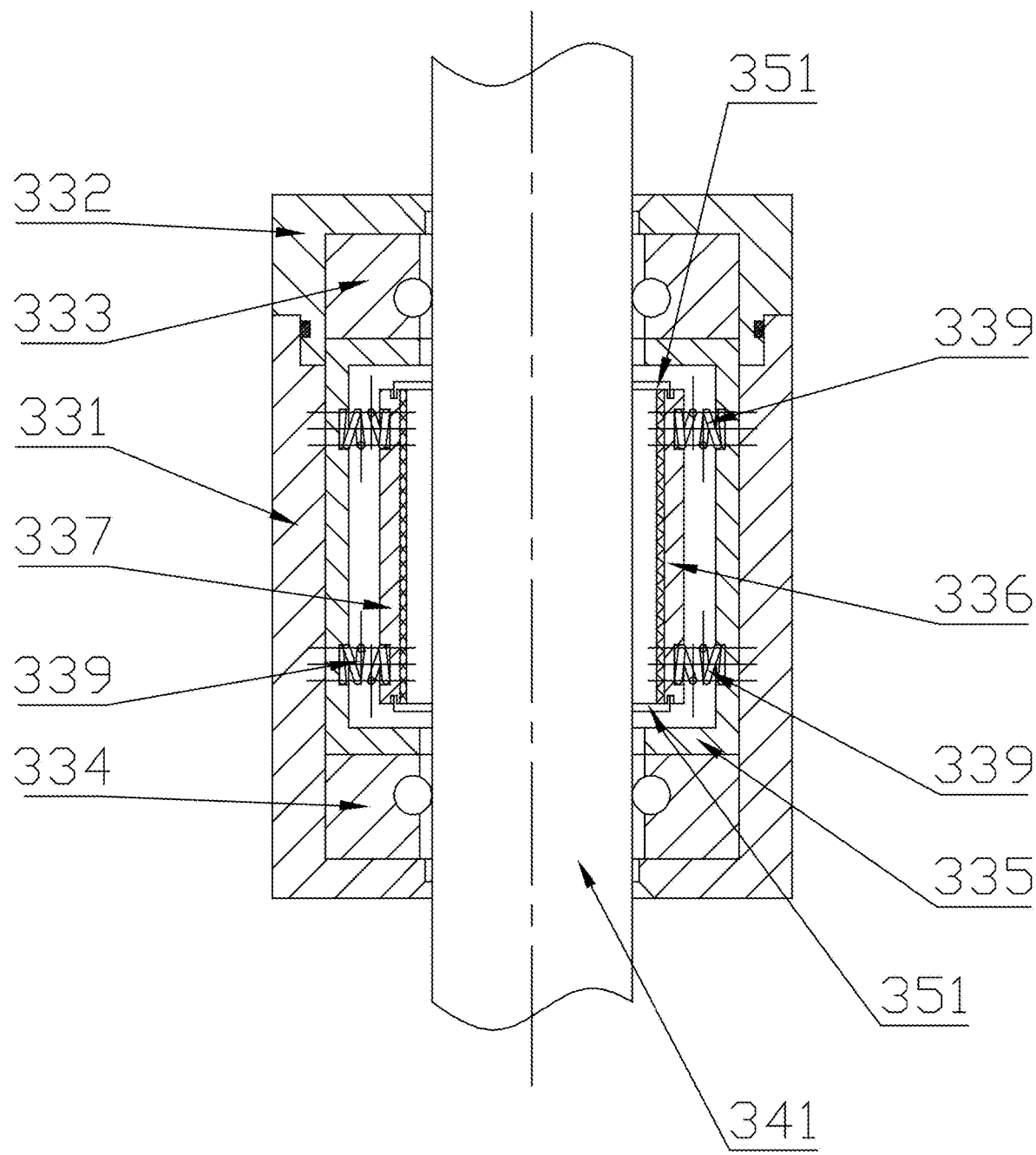
FIG. 6 is a second schematic diagram of a vertical cross-section structure of a sliding block assembly according to the present invention.
Figure 7:
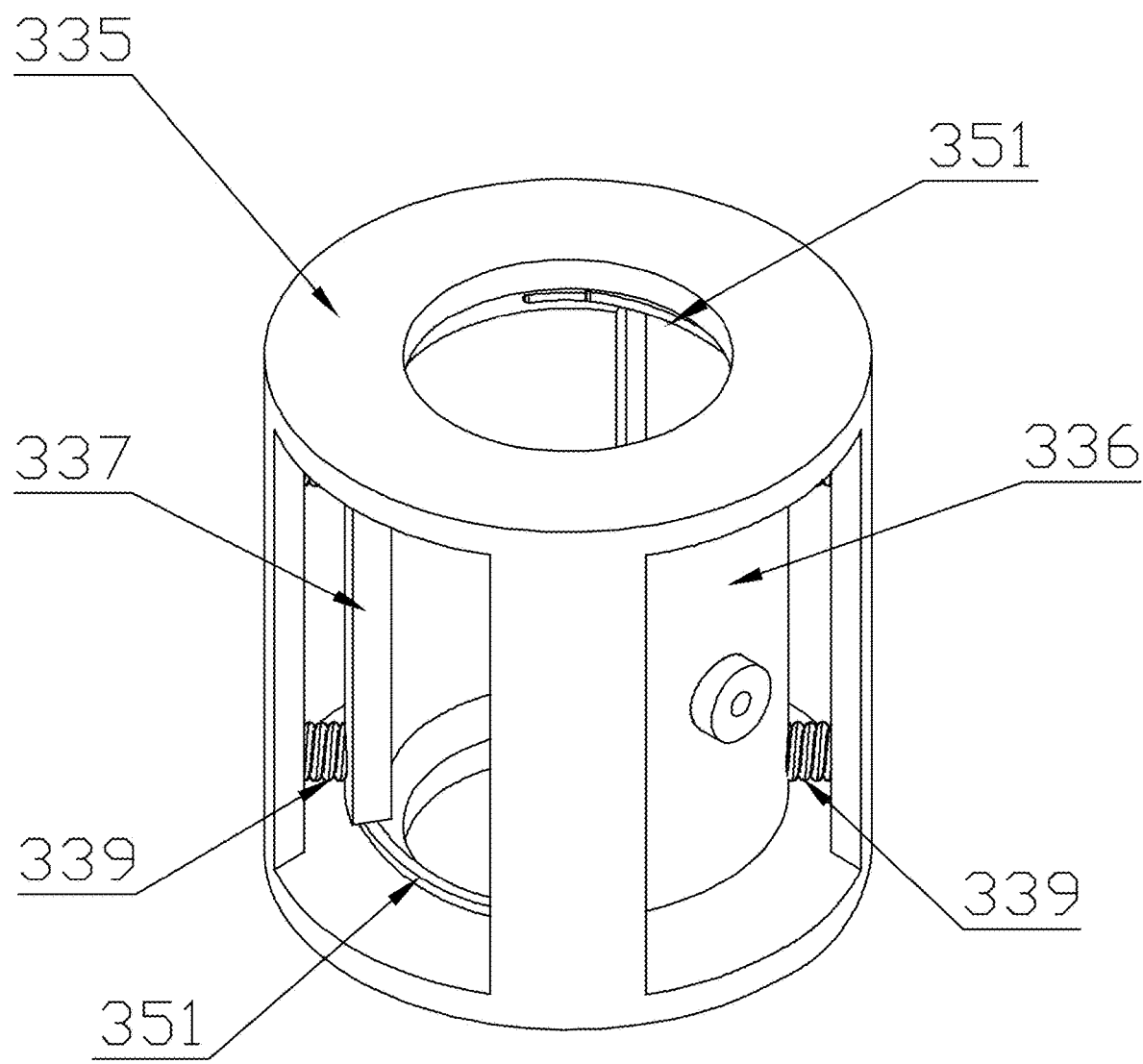
FIG. 7 is a three-dimensional axonometric diagram of a lock plate component according to the present invention.
Figure 8:
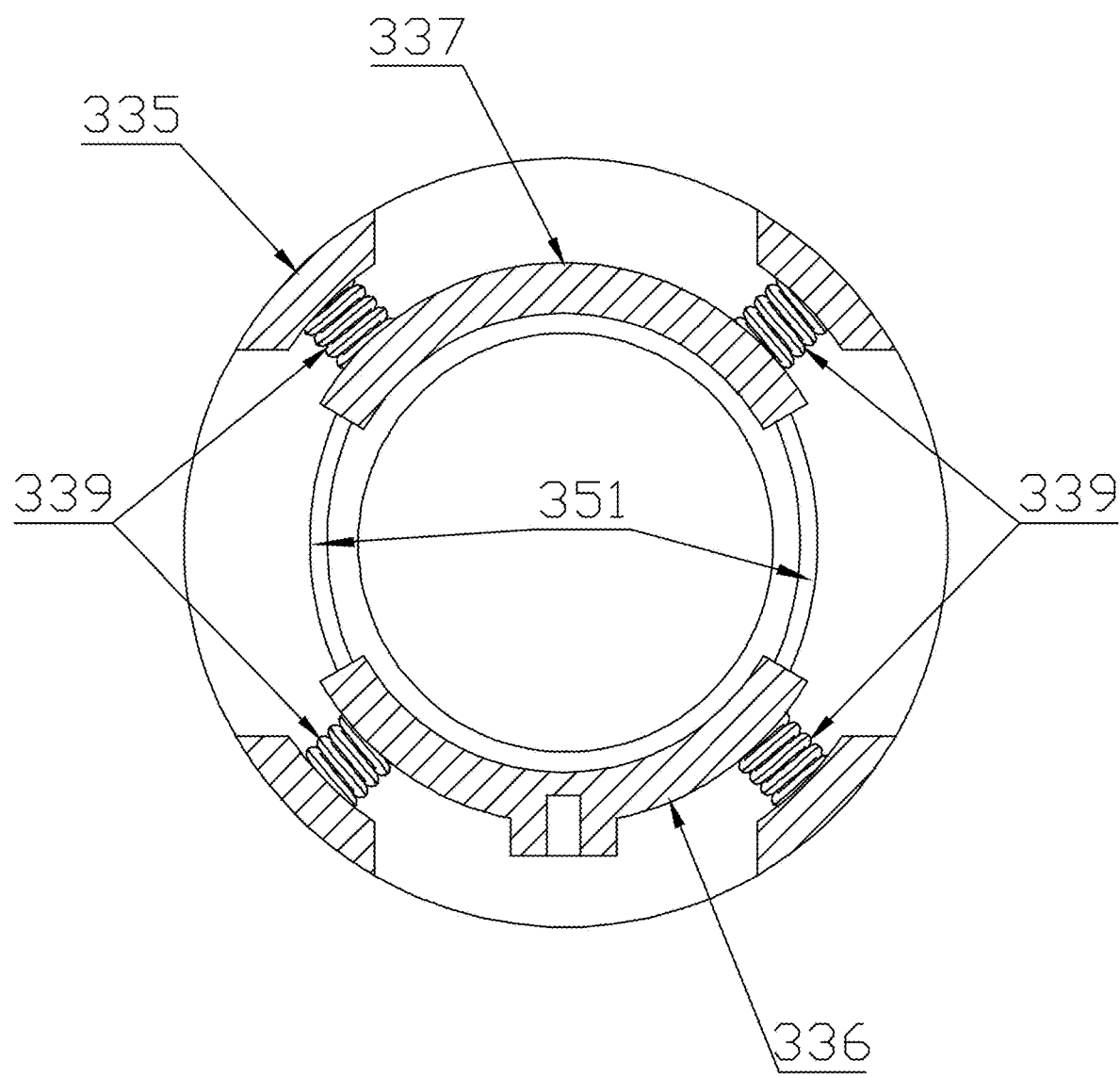
FIG. 8 is a horizontal cross-section structure of a lock plate component according to the present invention.

To facilitate control of the driving lock plate 336 and the driven lock plate 337 and ensure a locking and fixing effect, with reference to FIG. 6, FIG. 7, and FIG. 8, springs 339 are arranged between an outer wall surface of the driving lock plate 336 and an inner wall surface of the lock plate bracket 335 and are arranged between an outer wall surface of the driven lock plate 337 and the inner wall surface of the lock plate bracket 335, and the springs 339 are in a compressed state. The springs 339 can provide an initial force for locking and fixing for the driving lock plate 336 and the driven lock plate 337, which facilitates effective locking and fixing without clamping the sliding rod 341 too tightly, and avoid causing damage to a surface of the sliding rod 341. In addition, the springs 339 can ensure that the driving lock plate 336 and the driven lock plate 337 are always locked and fixed to the sliding rod 341 when the lock motor 338 or transmission fails.

To improve a locking and fixing effect of the springs 339 and ensure stability of lock plate components, preferably, with reference to FIG. 7 and FIG. 8 again, a total quantity of springs 339 are eight, four springs are distributed between the outer wall surface of the driving lock plate 336 and the inner wall surface of the lock plate bracket 335 in a rectangular array form, and other four springs are distributed between the outer wall surface of the driven lock plate 337 and the inner wall surface of the lock plate bracket 335.

To limit and fix the springs 339, spring fixing grooves are usually provided on abutting portions thereof.

Specifically, with reference to FIG. 1 and FIG. 2 again, the water driving assembly 400 includes at least three motor drive mechanisms 410 that are evenly distributed along a circumferential direction of the housing 120, the motor drive mechanism 410 includes a motor bracket 411 arranged on an outer side wall of the housing 120, a drive motor 412 is arranged on the motor bracket 411, a screw 413 is in transmission connection with a drive end of the drive motor 412, and the screw 413 is mated with a threaded hole provided on a container wall of the liquid storage container 110. In this way, the drive motor 412 drives the screw 413 to rotate, so that the housing 120 may be driven under the action of threaded transmission to be close to or away from the inner bottom surface of the liquid storage container 110. The drive motor 412 may be of a plurality types, and preferably, may be a stepper motor or a servo motor that facilitates control of a rotating speed, to effectively control a distance between the housing 120 and the inner bottom surface of the liquid storage container 110, thereby improving the leveling efficiency and effect.

Preferably, the automatic leveling type maintenance platform for a high-temperature gas cooled reactor further includes a control assembly.

The control assembly includes a controller in communication connection with the drive motor 412 and a liquid level sensor 510 in communication connection with the controller. The communication connection communication established between connected devices through transmission interaction of signals, which may be divided into wired connection and wireless connection. The wired connection is usually connection through a cable, an optical fiber, and the like. The wireless connection is usually connection through radio communication, Bluetooth, infrared, NFC, and the like.

There are at least three liquid level sensors 510, which are arranged in the working cavity of the housing 120 and are evenly distributed around the central axis of the housing 120. The liquid level sensor 510 is mainly configured to detect the leveling liquid flowing into the working cavity of the housing 120 is sufficient. Generally, when the leveling liquid is not detected by any liquid level sensor 510, the controller controls the drive motor 412 to quickly operate, so that the housing 120 quickly approach the inner bottom surface of the liquid storage groove 110. When the leveling liquid is detected by more than one liquid level sensor 510, the controller controls the drive motor 412 to reduce a driving speed, so that the housing 120 slowly approaches the inner bottom surface of the liquid storage groove 110. When the leveling liquid is detected by all liquid level sensors 510, the controller controls the drive motor 412 to stop operating.

Specifically, referring to FIG. 4 again, a liquid level sensor mounting groove 125 is provided on the inner side wall of the housing 120, and the liquid level sensor 510 is arranged in the liquid level sensor mounting groove 125.

Preferably, a central angle between the liquid level sensor mounting groove 125 and the sliding groove 122 is 45°. The liquid level sensors 510 are arranged based on the angle, which facilitates preferable detection of the leveling liquid at various angles, and ensures that the leveling liquid can also be effectively detected when platform is tilted.

The automatic leveling type maintenance platform for a high-temperature gas cooled reactor is mounted on the spherical top cap of the pressure vessel, a position of the housing 120 is controlled to enable the leveling liquid to flow into the working cavity of the housing 120, so that the floating plate 310 of the housing 120 floats on the leveling liquid under the action of buoyancy and is automatically leveled. A specific process is as follows:

S1: Mount and Level

The automatic leveling type maintenance platform for a high-temperature gas cooled reactor is mounted at a required position on the spherical top cap of the pressure vessel through the support assembly 200, and the support legs 210 are substantially adjusted and fixed. As shown in FIG. 1 and FIG. 2, in this case, the floating plate 310 is located on an inner bottom surface of the housing 120, the inner bottom surface of the liquid storage groove 110 is farthest from the inner bottom surface of the housing 120, and the entire platform may be in a tilted state but is shown in a horizontal state in FIG. 1 and FIG. 2.

Figure 3:
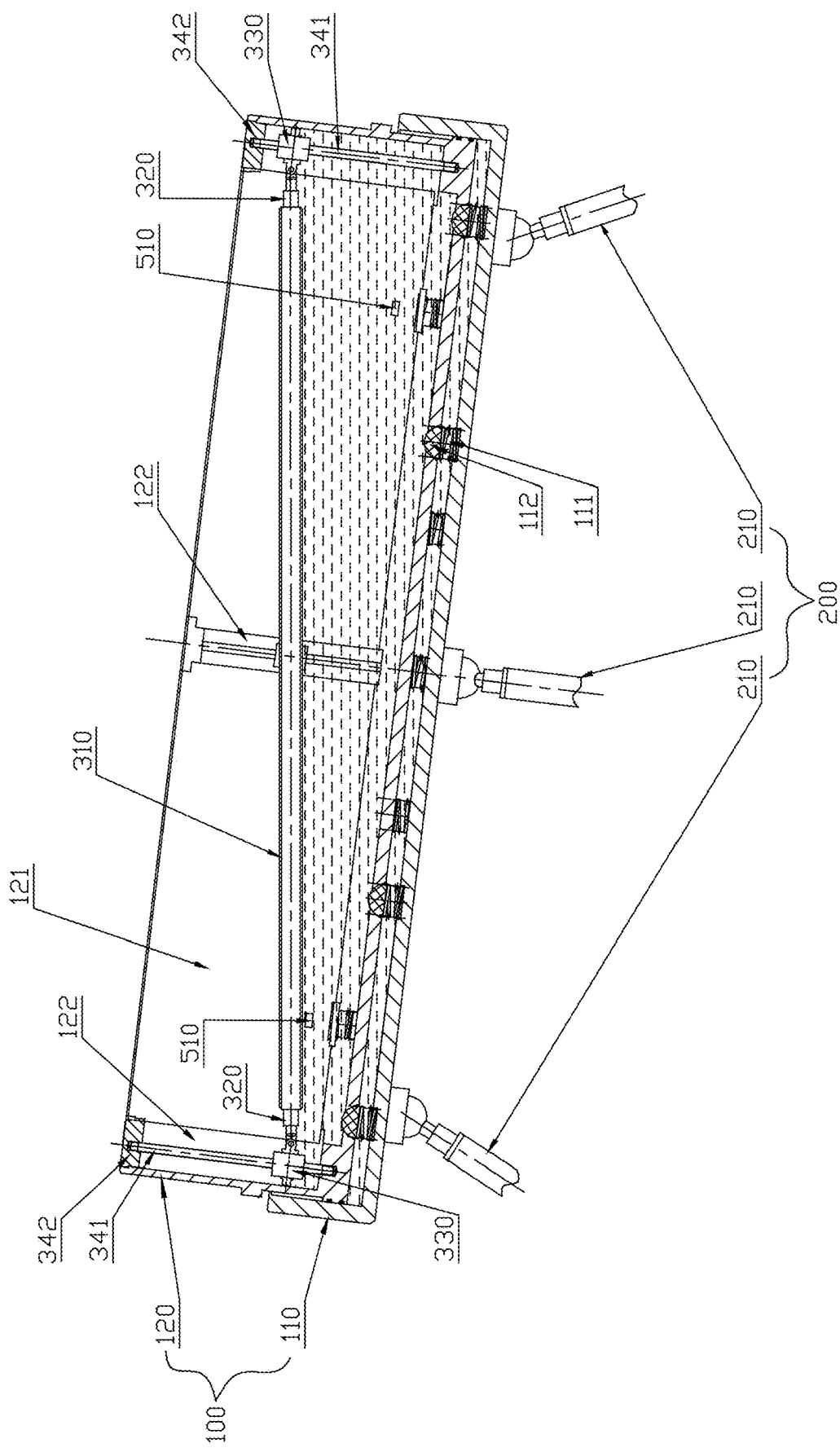
FIG. 3 is a schematic diagram of a vertical cross-section structure in a working structure according to the present invention.

When all the liquid level sensors 510 on the inner side wall of the housing 120 are not immersed in the leveling liquid, the drive motor 412 quickly rotates to drive the housing 120 to quickly approach the inner bottom surface of the liquid storage groove 110, the leveling liquid in the liquid storage groove 110 squeezes the upper sealing head 128 to compress the upper spring 127 and flows into the working cavity of the housing 120 through the liquid inlet hole 123, the floating plate 310 floats under the action of the leveling liquid and drives the sliding block assembly 330 to rise, and the floating plate 310 is quickly leveled by adjusting a length of the telescopic rod 320 and a rotation position of the telescopic rod 320 relative to the sliding block assembly 330. With a liquid level in the housing 120 rises, some liquid level sensors 510 are immersed, and in this case, the signal may be received by the controller, and the controller controls the drive motor 412 to reduce the rotating speed, to further perform fine-leveling on the floating plate 310 more smoothly. When all the liquid level sensors 510 are immersed, the controller controls the drive motor 412 to stop rotating, and in this case, the floating plate 310 is in the horizontal state, as shown in FIG. 3.

S2: Lock and Operate

With reference to FIG. 5, FIG. 6, FIG. 7, and FIG. 8, after the floating plate 310 is leveled, the lock motor 338 in the sliding block assembly 330 drives the driving lock plate 336 to be relatively close to the driven lock plate 337. The driving lock plate 336 and/or the driven lock plate 337 moves toward the sliding rod 341, the spring 339 is partially released, and the driven lock plate 337 may be affected by the synchronization rod 351 and move toward the sliding rod 341. Finally, the driving lock plate 336 and the driven lock plate 337 come into contact with and hold the sliding rod 341 to achieve locking and fixing, so that the sliding block assembly 330 cannot move up and down. In this case, the floating plate 310 is fixed at a horizontal position, the maintenance is locked and fixed, and maintenance operation is performed on the platform. The spring 339 can further provide a pressing force for the lock plates, and may continue to lock when an unforeseen circumstance occurs, for example, the lock motor 338 drives to disengage.

S3: Platform Recovery

After maintenance operation is completed, the lock motor 338 of the sliding block assembly 330 drives the driving lock plate 336 to move in a direction away from the sliding rod 341 and drives the synchronization rod 351 to move, the spring 339 is further compressed, the driven lock plate 337 is affected by the synchronization rod 351 and moves in the direction away from the sliding rod 341, and finally, the lock plate may release the sliding rod 341, and the sliding block assembly 330 may move up and down along the sliding rod 341. In this case, the drive motor 412 quickly rotates and drives the housing 120 to quickly rise to be away from the inner bottom surface of the liquid storage groove 110, the leveling liquid in the housing 120 squeezes the lower sealing head 112 downward to enable the lower spring 111 to be compressed. In this way, the leveling liquid in the housing 120 flows into the liquid storage groove 110 through the liquid outlet hole 124, the floating plate 310 is affected by the leveling liquid and drives the sliding block assembly 330 to move downward, and dropping of the liquid is achieved by adjusting extension or retraction and rotation of the telescopic rod 320. After the liquid level of the leveling liquid drops, some liquid level sensors 510 may be surfaced from the liquid level. In this case, the signal may be received by the controller, and the controller controls the drive motor 412 to reduce the rotating speed, so that the floating plate 310 drops more smoothly. When the liquid storage groove 110 comes into contact with a limiting boss at a lower end of the outer side wall of the housing 120, the controller controls the drive motor 412 to stop rotating, and in this case, the entire maintenance platform may be removed from the spherical top cap of the pressure vessel.

What is claimed is:

1. An automatic leveling maintenance platform for a high-temperature gas cooled reactor, comprising
a platform body,
a support assembly configured to support the platform body,
a floating leveling assembly, and
a water driving assembly,
wherein
the platform body comprises
a liquid storage container and
a housing nested and fitted to a liquid storage cavity of the liquid storage container;
a leveling liquid is accommodated in the liquid storage cavity of the liquid storage container, and a liquid inlet and outlet structure for the leveling liquid to flow in and flow out is arranged on a bottom plate of the housing;
the floating leveling assembly comprises
a floating plate arranged in a working cavity of the housing, wherein
at least three telescopic rods are evenly distributed along a circumferential direction of the floating plate and are arranged on a side wall of the floating plate,
a sliding block assembly is movably connected to a telescopic end of each of the at least three telescopic rods,
the sliding block assembly is arranged on an inner side wall of the housing through a lifting guide mechanism, and
the sliding block assembly
is movable along the lifting guide mechanism and
is configured to be locked and fixed to the lifting guide mechanism; and
the water driving assembly
is arranged on the platform body and
is configured to drive the housing to be close to or away from an inner bottom surface of the liquid storage container,
to enable the leveling liquid to flow into or flow out of the working cavity of the housing through the liquid inlet and outlet structure,
to provide buoyancy for automatic leveling of the floating plate.

2. The automatic leveling maintenance platform for the high-temperature gas cooled reactor according to claim 1, wherein the liquid inlet and outlet structure is provided with at least three liquid inlet holes and at least three liquid outlet holes;
the at least three liquid inlet holes are evenly distributed on the bottom plate of the housing around a central axis of the housing; and
the at least three liquid outlet holes are evenly distributed on the bottom plate of the housing around the central axis of the housing.

3. The automatic leveling maintenance platform for the high-temperature gas cooled reactor according to claim 2, wherein the liquid inlet and outlet structure further comprises
upper spring switch assemblies for opening and closing the at least three liquid inlet holes and
lower spring switch assemblies for opening and closing the at least three liquid outlet holes;
the upper spring switch assemblies and the at least three liquid inlet holes are of a same quantity and are arranged in one-to-one correspondence, each of the upper spring switch assemblies comprises
a spring support plate arranged in the working cavity of the housing,
an upper spring arranged at a bottom of the spring support plate, and
an upper sealing head arranged at a lower end of the upper spring,
wherein the upper sealing head blocks an upper liquid outlet of each of the at least three liquid inlet holes; and
the lower spring switch assemblies and the at least three liquid outlet holes are of a same quantity and are arranged in one-to-one correspondence,
each of the lower spring switch assemblies comprises
a lower spring arranged on the inner bottom surface of the liquid storage container,
a lower sealing head is arranged at an upper end of the lower spring, and
the lower sealing head blocks a lower liquid outlet of each of the at least three liquid outlet holes.

4. The automatic leveling maintenance platform for the high-temperature gas cooled reactor according to claim 1, wherein the support assembly comprises at least three support legs arranged at a bottom of the liquid storage container, and
the support legs are evenly distributed around a central axis of the platform body.

5. The automatic leveling maintenance platform for the high-temperature gas cooled reactor according to claim 1, wherein
the floating plate is of a circular structure, and
the at least three telescopic rods are radially arranged along the floating plate.

6. The automatic leveling maintenance platform for the high-temperature gas cooled reactor according to claim 1, wherein
a sliding groove is provided on the inner side wall of the housing;
the sliding block assembly comprises
a sliding block housing,
a sliding block end cap is arranged at an end of the sliding block housing, and
the sliding block end cap and the sliding block housing jointly enclose a sliding block cavity running through up and down;
an upper ball component, a lock plate component, and a lower ball component are sequentially arranged in the sliding block cavity from top to bottom;
the lock plate component comprises a lock plate bracket,
wherein a driving lock plate and a driven lock plate that is in transmission connection with the driving lock plate are arranged in the lock plate bracket, and
a locking space is formed between the driven lock plate and the driving lock plate; and
the sliding block assembly further comprises a lock motor arranged on the sliding block housing, and
the lock motor and the driving lock plate are in transmission connection to drive the driving lock plate to be relatively close to or away from the driven lock plate; and
the lifting guide mechanism comprises a sliding rod arranged in the sliding groove, and
the sliding rod extends through the locking space and rollably fits a ball of the upper ball component and a ball of the lower ball component respectively.

7. The automatic leveling maintenance platform for the high-temperature gas cooled reactor according to claim 6, wherein the lifting guide mechanism further comprises a sliding rod support block arranged on an upper end of the sliding groove;
an upper end of the sliding rod is connected to the sliding rod support block, and
a lower end of the sliding rod is connected to a lower end groove wall of the sliding groove; and
springs
are arranged between an outer wall surface of the driving lock plate and
an inner wall surface of the lock plate bracket and
are arranged between an outer wall surface of the driven lock plate and the inner wall surface of the lock plate bracket, and
the springs are in a compressed state.

8. The automatic leveling maintenance platform for the high-temperature gas cooled reactor according to claim 1, wherein the water driving assembly comprises at least three motor drive mechanisms,
wherein the at least three motor drive mechanisms are evenly distributed along a circumferential direction of the housing,
each of the at least three motor drive mechanisms comprises a motor bracket arranged on an outer side wall of the housing,
a drive motor is arranged on the motor bracket,
a screw is in transmission connection with a drive end of the drive motor, and
the screw is mated with a threaded hole provided on a container wall of the liquid storage container.

9. The automatic leveling maintenance platform for the high-temperature gas cooled reactor according to claim 8, further comprising a control assembly, wherein
the control assembly comprises
a controller in communication connection with the drive motor and at least three liquid level sensors in communication connection with the controller; and
the at least three liquid level sensors
are arranged in the working cavity of the housing and are evenly distributed around a central axis of the housing.

10. The automatic leveling maintenance platform for the high-temperature gas cooled reactor according to claim 9, wherein a liquid level sensor mounting groove is provided on the inner side wall of the housing, and
each of the at least three liquid level sensors is arranged in the liquid level sensor mounting groove.

11. The automatic leveling maintenance platform for the high-temperature gas cooled reactor according to claim 2, wherein the water driving assembly comprises at least three motor drive mechanisms,
wherein the at least three motor drive mechanisms are evenly distributed along a circumferential direction of the housing,
each of the at least three motor drive mechanisms comprises
a motor bracket arranged on an outer side wall of the housing,
a drive motor is arranged on the motor bracket,
a screw is in transmission connection with a drive end of the drive motor, and the screw is mated with a threaded hole provided on a container wall of the liquid storage container.

12. The automatic leveling maintenance platform for the high-temperature gas cooled reactor according to claim 3,
wherein the water driving assembly comprises at least three motor drive mechanisms,
wherein the at least three motor drive mechanisms are evenly distributed along a circumferential direction of the housing,
each of the at least three motor drive mechanisms comprises
a motor bracket arranged on an outer side wall of the housing,
a drive motor is arranged on the motor bracket,
a screw is in transmission connection with a drive end of the drive motor, and
the screw is mated with a threaded hole provided on a container wall of the liquid storage container.

13. The automatic leveling maintenance platform for the high-temperature gas cooled reactor according to claim 4,
wherein the water driving assembly comprises at least three motor drive mechanisms,
wherein the at least three motor drive mechanisms are evenly distributed along a circumferential direction of the housing,
each of the at least three motor drive mechanisms comprises
a motor bracket arranged on an outer side wall of the housing,
a drive motor is arranged on the motor bracket,
a screw is in transmission connection with a drive end of the drive motor, and
the screw is mated with a threaded hole provided on a container wall of the liquid storage container.

14. The automatic leveling maintenance platform for the high-temperature gas cooled reactor according to claim 5,
wherein the water driving assembly comprises at least three motor drive mechanisms,
wherein the at least three motor drive mechanisms are evenly distributed along a circumferential direction of the housing,
each of the at least three motor drive mechanisms comprises
a motor bracket arranged on an outer side wall of the housing,
a drive motor is arranged on the motor bracket,
a screw is in transmission connection with a drive end of the drive motor, and
the screw is mated with a threaded hole provided on a container wall of the liquid storage container.

15. The automatic leveling maintenance platform for the high-temperature gas cooled reactor according to claim 6,
wherein the water driving assembly comprises at least three motor drive mechanisms,
wherein the at least three motor drive mechanisms are evenly distributed along a circumferential direction of the housing,
each of the at least three motor drive mechanisms comprises
a motor bracket arranged on an outer side wall of the housing,
a drive motor is arranged on the motor bracket,
a screw is in transmission connection with a drive end of the drive motor, and
the screw is mated with a threaded hole provided on a container wall of the liquid storage container.

16. The automatic leveling maintenance platform for the high-temperature gas cooled reactor according to claim 7,
wherein the water driving assembly comprises at least three motor drive mechanisms,
wherein the at least three motor drive mechanisms are evenly distributed along a circumferential direction of the housing,
each of the at least three motor drive mechanisms comprises
a motor bracket arranged on an outer side wall of the housing,
a drive motor is arranged on the motor bracket,
a screw is in transmission connection with a drive end of the drive motor, and
the screw is mated with a threaded hole provided on a container wall of the liquid storage container.

* * * * *